United States Patent
Raboini et al.

(10) Patent No.: US 11,905,154 B2
(45) Date of Patent: Feb. 20, 2024

(54) CAPPING PLANT AND A METHOD FOR CAPPING AND CONVEYING CONTAINERS MADE OF THERMOPLASTIC MATERIAL

(71) Applicant: GEA PROCOMAC S.P.A., Sala Baganza (IT)

(72) Inventors: Gianmaria Raboini, Collecchio (IT); Vittorio Bellini, San Secondo Parmense (IT)

(73) Assignee: GEA PROCOMAC S.P.A., Sala Baganza (IT)

(*) Notice: Subject to any disclaimer, the term of this patent is extended or adjusted under 35 U.S.C. 154(b) by 299 days.

(21) Appl. No.: 17/296,311

(22) PCT Filed: Dec. 10, 2019

(86) PCT No.: PCT/IB2019/060618
§ 371 (c)(1),
(2) Date: May 24, 2021

(87) PCT Pub. No.: WO2020/165641
PCT Pub. Date: Aug. 20, 2020

(65) Prior Publication Data
US 2022/0024741 A1  Jan. 27, 2022

(30) Foreign Application Priority Data

Feb. 15, 2019  (IT) .................. 102019000002253

(51) Int. Cl.
*B67B 3/20* (2006.01)
*B65G 21/20* (2006.01)
*B65G 47/84* (2006.01)

(52) U.S. Cl.
CPC ........ *B67B 3/2033* (2013.01); *B65G 21/2072* (2013.01); *B65G 47/846* (2013.01); *B65G 2207/08* (2013.01); *B67B 2201/08* (2013.01)

(58) Field of Classification Search
CPC ..... B67B 3/2033; B67B 2201/08; B67C 3/24; B67C 3/242; B67C 3/2642; B67C 7/004;
(Continued)

(56) References Cited

U.S. PATENT DOCUMENTS 3,242,632 A * 3/1966 Dimond ................ B67B 3/2033
53/308
4,624,098 A * 11/1986 Trendel ................. B67B 3/2033
53/317
(Continued)

FOREIGN PATENT DOCUMENTS

DE  29505245 U1  4/1996
WO  9529860 A1  11/1995

*Primary Examiner* — Stephen F. Gerrity
(74) *Attorney, Agent, or Firm* — Pearne & Gordon LLP; Bryan M. Gallo

(57) ABSTRACT

A capping plant (10) for capping containers (100) made of thermoplastic material, includes a capping unit (11) of a rotating carousel type comprising a plurality of capping stations (111) and a first profile (114) arranged so as to contact a part of a tubular body (100a) of the containers (100) which is exposed towards an outside of the rotating carousel of the capping unit (11); a star-wheel (12) located downstream of the capping unit (11); an outfeed conveyor (13) located downstream of the star-wheel (12); a connection cross-member (17) between the first profile (14) and the outfeed conveyor (13), the outfeed conveyor (13) is integrally constrained to a first portion (17a) of the connection cross-member (17) and the first profile (114) is integrally constrained to a second portion (17b) of the connection cross-member (17); an actuating device (18) configured to adjust the height of the connection cross-member (17).

14 Claims, 4 Drawing Sheets

(58) Field of Classification Search
CPC ... B67C 7/0046; B67C 7/0053; B67C 7/0073; B67C 2003/228; B65G 21/2072; B65G 47/846; B65G 2207/08
USPC ....... 53/426, 453, 490, 558, 561, 317, 331.5
See application file for complete search history.

(56) References Cited

U.S. PATENT DOCUMENTS

| | | | |
|---|---|---|---|
| 4,658,565 A | | 4/1987 | Westbrook et al. |
| 4,880,098 A | * | 11/1989 | Kronseder ................ B67C 3/24 198/346.2 |
| 9,181,043 B1 | | 11/2015 | Goudy et al. |
| 2010/0205904 A1 | * | 8/2010 | Zanini et al. ......... B67B 3/2033 53/287 |

* cited by examiner

CAPPING PLANT AND A METHOD FOR CAPPING AND CONVEYING CONTAINERS MADE OF THERMOPLASTIC MATERIAL

TECHNICAL FIELD

The present invention relates to a capping plant and a method for capping and conveying containers made of thermoplastic material.

The reference sector is the bottling of so-called "sensitive" food products, that is, products that are particularly sensitive to bacteriological contamination and oxidation, such as, for example, isotonic drinks, juices, nectars, soft drinks, tea, milk-based drinks, coffee-based drinks, etc., for which the prevention of possible microbiological contamination throughout all packaging stages is of fundamental importance.

BACKGROUND ART

Packaging lines using aseptic technology are already known in the prior art, wherein the various operations take place in a contamination-controlled environment, so that the bottled products can be stored for a prolonged period of time and have chemical/physical and organoleptic stability even at room temperature.

A modern concept of an aseptic bottling line thus includes:
- sterilisation of the parison using chemical agents or radiation sterilization;
- "aseptic" forming of the container starting from the sterilized parison;
- filling and capping of the filled container, to be carried out in a sterile environment.

In this context, attention turns to the capsuling unit of the containers in an aseptic line, by means of pressure caps or capsules.

In a capsuling unit of the rotating carousel type, the containers follow a circular path, with an ad hoc guide system which opposes the oscillation thereof.

For example, a known solution includes the use of:
- an internal guide to the circular path, in which compartments are made that are dimensioned so as to abut on the part of the containers facing towards the inside;
- a guide external of the circular path (usually known in the sector as a "counter-guide") which extends in an annular fashion to abut on the part of the body of the containers which faces outwardly.

In the case of a format change it is necessary to intervene on the guides to reposition them or even replace them as a function of the shape and dimensions of the body of the containers.

In particular, the inside guide adapts to containers having different diameters due to the fact that the compartments are adjustable in size.

As concerns the counter-guide, on the other hand, it has to be replaced with one that is suitable for the new format. For this purpose, the producer generally provides, supplied with the capsuling unit, a set of counter-guides having various dimensions.

In an aseptic context, manual procedures for replacing the guides are not practicable when using handling gloves; it instead becomes necessary to open the isolator access door protecting the capsuling unit, a consequent loss of sterile conditions. Upon completion of the operation, the sterile conditions of the environment must be restored, resulting in an evident loss of time due to downtime of the line.

Most of all, the protection of the variously-sized counter-guides increases volumes and management costs in the warehouse. On the other hand, having only a few varied parts available limits the capsuling units to only a small number of applications.

DISCLOSURE OF THE INVENTION

In this context, the technical task at the basis of the present invention is to propose a capping plant and a method for capping and conveying containers made of thermoplastic material which obviates the drawbacks of the aforementioned prior art.

In particular, an object of the present invention is to provide a capping plant of containers made of thermoplastic material that is easily and rapidly adaptable to various formats.

A further aim of the present invention is to provide a capping plant of containers made of thermoplastic material in which the operations for maintaining the sterility are simplified.

The defined technical task and the specified objects are substantially achieved by a capping plant for containers made of thermoplastic material, comprising:
- a capping unit of a rotating carousel type comprising a plurality of capping stations for applying concave closures to the containers and first guide means arranged so as to contact a part of a tubular body of the containers which is exposed towards an outside of the rotating carousel of the capping unit;
- a star-wheel located downstream of the capping unit for receiving the capped containers, i.e. containers to which the concave closures have been applied;
- an outfeed conveyor located downstream of the star-wheel, characterised in that it comprises:
- a connection cross-member between said first guide means and the outfeed conveyor, said outfeed conveyor being integrally constrained to a first portion of the connection cross-member and said first guide means being integrally constrained to a second portion of the connection cross-member;
- an actuating device configured to adjust the height of said connection cross-member.

The actuating device is controlled by a motor or manually.

According to an embodiment, the first guide means comprise a first profile having a substantially arched extension that is coaxial to and external of a circular path defined by the containers during rotation of the rotating carousel of the capping unit.

The first profile is preferably made of a flexible material, for example plastic material.

According to an embodiment, the capping plant further comprises second guide means arranged so as to contact a part of the tubular body of the containers which part is facing towards an inside of the rotating carousel of the capping unit.

The second guide means are preferably slidably mounted on a third portion of the connection cross-member.

In particular, the second guide means comprise a second profile having a substantially arched extension that is coaxial to and internal of a circular path defined by the containers during rotation of the rotating carousel of the capping unit.

The second profile has a plurality of compartments to receive the part of the tubular body of the containers which part is facing towards the inside of the rotating carousel of the capping unit.

The compartments preferably have an adjustable size.

The capping plant preferably comprises a box-like body defining a contamination-controlled environment, isolated from an external environment. The capping unit, the star-wheel, the outfeed conveyor, the connection cross-member and the actuating device are located in the contamination-controlled environment. The actuating device is configured to receive commands from the external environment.

The specific technical purpose and the specified aims are substantially attained by a method for capping and conveying containers made of thermoplastic material, comprising steps of:
- applying to each container a concave closure in a capping unit of the rotating carousel type;
- during the rotation of the rotating carousel of the capping unit, guiding the containers to define a circular path via first guide means arranged so as to contact a part of a tubular body of the containers which part is exposed towards the outside of the rotating carousel of the capping unit;
- transferring the capped containers from the capping unit to a star-wheel in which the containers are supported by the neck thereof, characterised by:
- transferring the containers from the star-wheel to an outfeed conveyor integrally constrained to the first guide means via a connection cross-member;
- adjusting the height of the connection cross-member in a case of a format change.

The adjustment of the height takes place manually or by means of a motorised control.

According to an embodiment, in the definition of the circular path the containers are also guided by second guide means arranged so as to contact a part of the tubular body of the containers which part is facing towards an inside of the rotating carousel of the capping unit.

The second guide means are slidably mounted on the connection cross-member.

The specific technical purpose and the specified aims are substantially attained by a bottling line of aseptic containers, comprising:
- a forming unit for forming sterile containers;
- a filling unit of the containers, which is located downstream of the forming unit;
- a capping plant, according to the present invention, located downstream of the filling unit.

The containers pass from the forming unit to the filling unit to the capping plant internally of a volume delimited by a further box-like body which is connected to the box-like body of the capping plant or which constitutes an extension thereof.

BRIEF DESCRIPTION OF DRAWINGS

Further characteristics and advantages of the present invention will become more apparent from the following indicative and therefore non-limiting description of a capping plant and a method for capping and conveying containers made of thermoplastic material, as illustrated in the appended drawings in which.

DETAILED DESCRIPTION OF PREFERRED EMBODIMENTS OF THE INVENTION

Figure 1A:
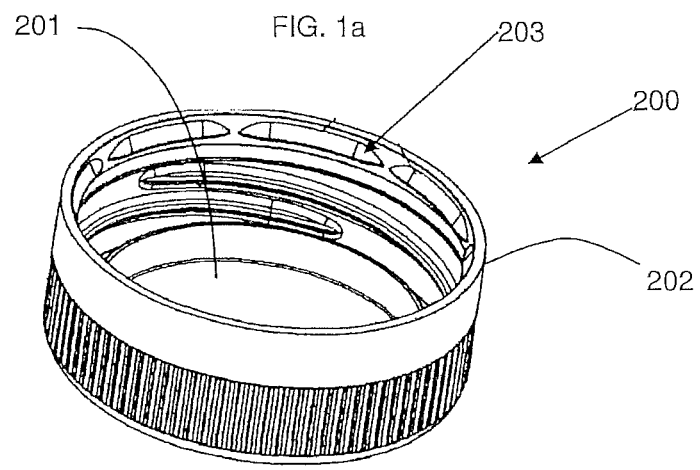
FIGS. 1a and 1b illustrate two different types of concave closure, respectively a flat cap and a sport cap, in a perspective view.

With reference to the figures, reference numeral 10 denotes a capping plant for capping containers 100 made of thermoplastic material, for example PET.

The capping plant 10 comprises:
- a capping unit 11 of a rotating carousel type comprising a plurality of capping stations 111 for applying concave closures 200 to the containers 100;
- a star-wheel 12 located downstream of the capping unit 11;
- an outfeed conveyor 13 located downstream of the star-wheel 12.

Each container 100 has a tubular body 100a, a threaded neck 100b and a mouth.

In this context, by concave closure 200 is meant a cap or a capsule to be applied to the mouth of the container 100.

The concave closure 200 is preferably made of polymeric material.

FIG. 1a illustrates a first format of the concave closure: this is a flat cap.

Figure 1B:
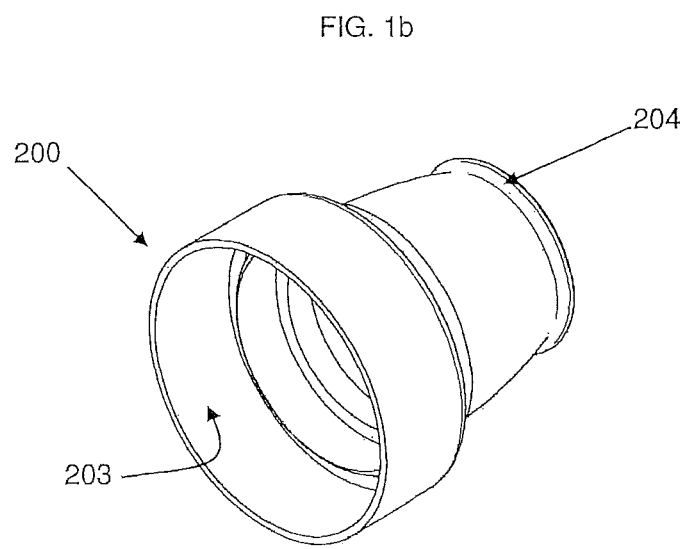
Figure 2:
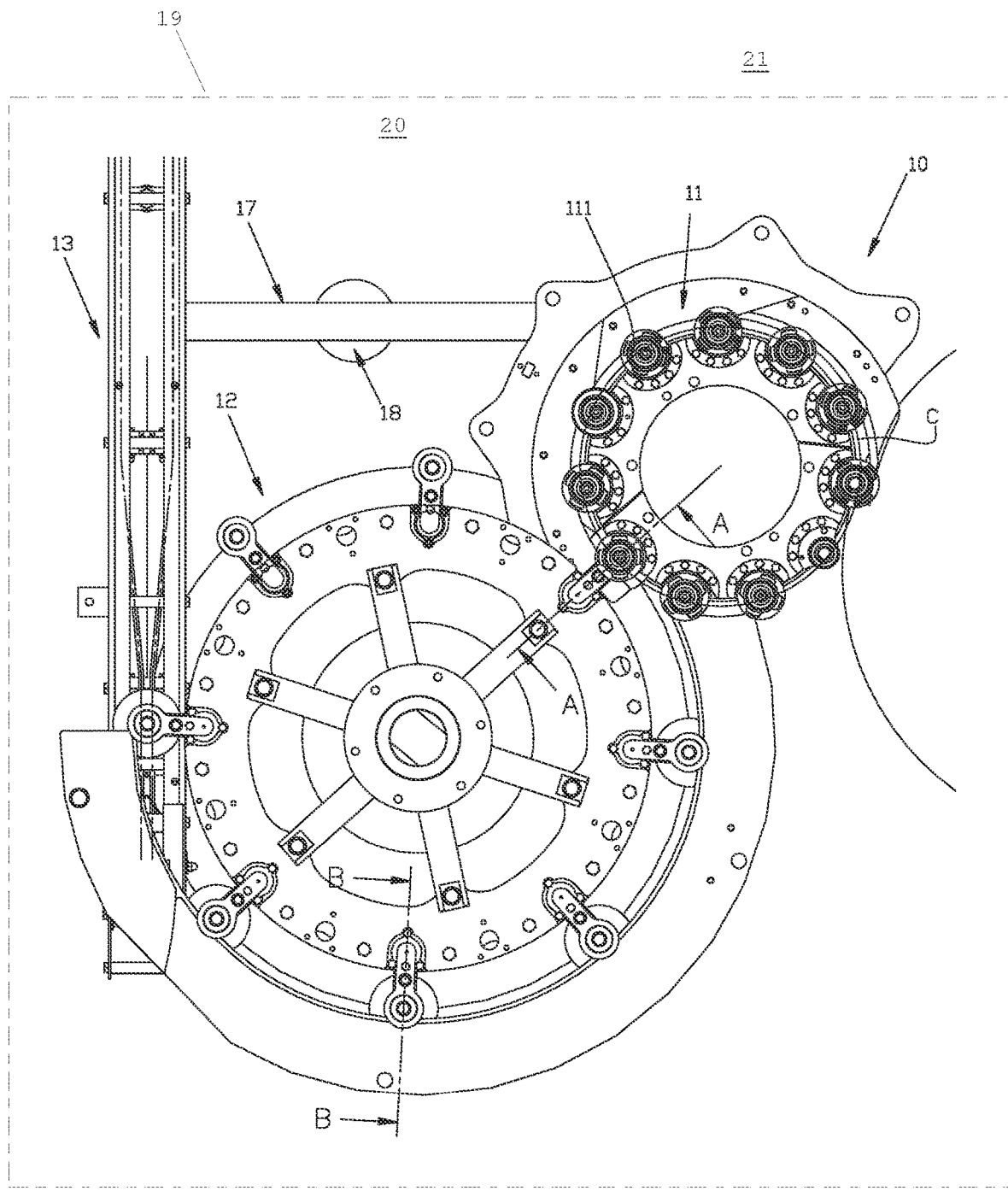
FIG. 2 shows a capping plant for containers of thermoplastic material, according to the present invention, seen from above.
Figure 3:
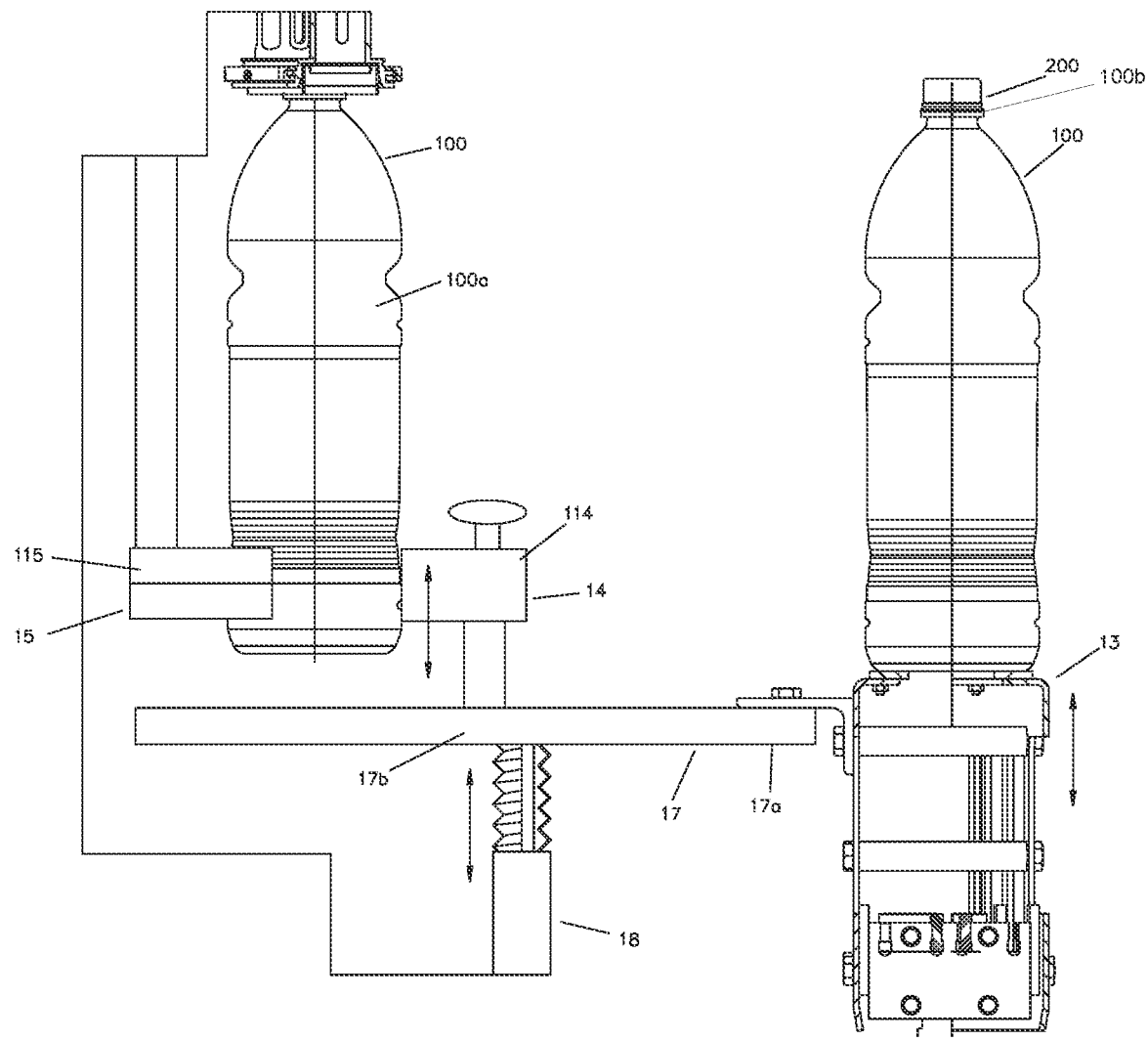
FIGS. 3 and 4 illustrate the connection of a capping station and the outfeed conveyor of the capping plant of FIG. 2, in a section lateral view, according to two different embodiments of the invention.

FIG. 1b illustrates a second format of the concave closure: this is a sport cap.

The flat cap concave closure 200 has a discoid base 201 and a substantially cylindrical lateral surface 202 which extends from the discoid base 201 and defines a cavity 203 therewith. On the opposite side to the discoid base 201, the cavity 203 is open so as to accommodate the mouth of the container 100.

The sport cap concave closure 200 has a projecting spout 204 instead of the discoid base.

By effect of the rotation of the rotating carousel of the capping unit 11, the containers 100 describe a circular path C during which they are capped, i.e. a corresponding concave closure 200 is applied to the mouth of each container 100.

The containers, capped in this way, are then passed on to the star-wheel 12 which, in turn, delivers them to the outfeed conveyor 13.

The capping unit 11 comprises:
- first guide means 14 arranged so as to contact a part of the tubular body 100a of the containers 100 which part is exposed to an outside of the rotating carousel of the capping unit 11;
- second guide means 15 arranged so as to contact a part of the tubular body 100a of the containers 100 which part is facing towards an inside of the rotating carousel of the capping unit 11.

In particular, the first guide means 14 extend beyond the circular path C with respect to the rotation axis of the rotating carousel of the capping unit 11, while the second guide means 15 extend into the circular path C.

According to the embodiment described and illustrated herein, the first guide means 14 comprise a first profile 114 having a substantially arched extension that is coaxial to and external of a circular path C.

The first profile 114 is preferably made of a flexible material, for example flexible plastic material, while the rest of the structure of the first guide means 14 is made of steel. In this way, the first profile 114 is easily adaptable in a radial direction to various formats of the containers 100.

According to the embodiments described and illustrated herein, the second guide means 15 comprise a second profile 115 having a substantially arched extension that is coaxial to and external of the circular path C.

In particular, the second profile 115 comprises a plurality of compartments for receiving the part of the tubular body 100a of the containers 100 facing towards an inside of the rotating carousel of the capping unit 11.

The compartments are preferably equidistanced along the arched extension of the second profile 115.

In accordance with one embodiment, the compartments have an adjustable size. In this way, they can easily adapt in a radial direction to various formats of the containers 100.

For example, each compartment is delimited by a pair of hinged elements that are mutually mobile so as to move away or towards one another, by increasing or reducing the size of the compartment.

According to a further embodiment, the compartments consist of semi-circular recesses or indentations afforded on the outer edge of the second profile 115. In this case, the compartments have a fixed size.

The capping plant 10 advantageously comprises connection cross-member 17 between the first guide means 14 and the outfeed conveyor 13.

In particular, the outfeed conveyor 13 is integrally constrained to a first portion 17a of the connection cross-member 17 and the first guide means 14 are constrained to a second portion 17b of the connection cross-member 17.

Figure 4:
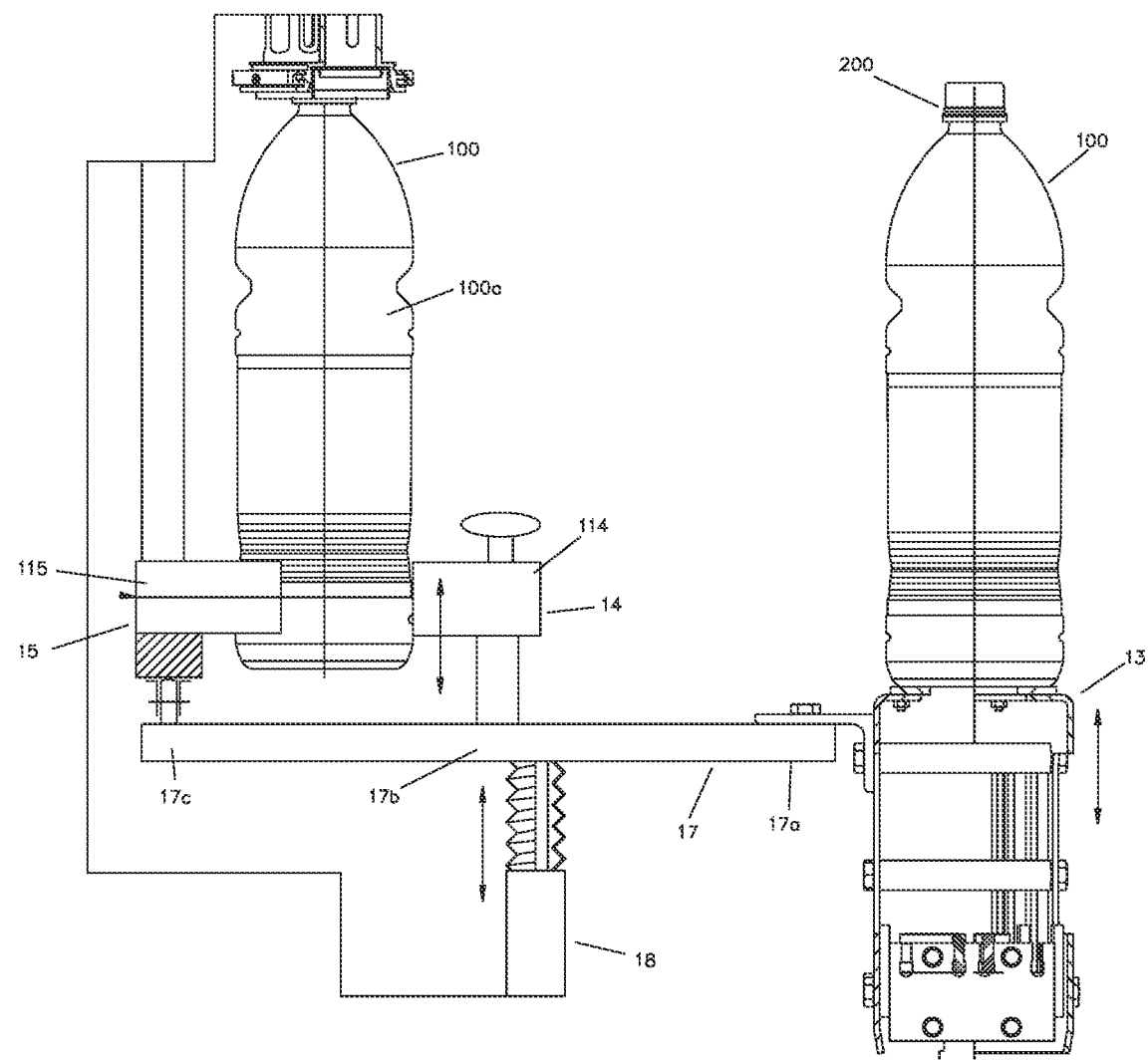

According to the embodiment illustrated in FIG. 4, the second guide means 15 are slidably mounted on a third portion 17c of the connection cross-member 17.

The first portion 17a and the second portion 17b of the connection cross-member 17 are situated at two opposite ends of the cross-member 17 itself.

The height of the connection cross-member 17 is originally adjustable using an actuating device 18. In this context, by height of the connection cross-member 17 is meant the height thereof with respect to a rest plane of the capping unit 11.

In an embodiment, the capping unit 11 the star-wheel 12, the outfeed conveyor 13 and the connection cross-member 17 are located in the box-like body 19, defining a contamination-controlled environment 20 isolated from an external environment 21.

The actuating device 18 is preferably also situated inside the contamination-controlled environment 20, while the control or controls of the actuating device 18 are set from the external environment 21.

The controls can be manual or motorised.

From the description given, the features of the capping plant and a method for capping and conveying containers made of thermoplastic material according to the present invention appear clear, as do the advantages thereof.

In particular, the proposed invention no longer requires the replacement of the counter-guide in the case of format change as the counter-guide (i.e. the first profile) has been made height-adjustable due to the solid mounting thereof to the connection cross-member (and, therefore, the conveyor belt). This undoubtedly reduces line shutdowns and the issues due to the re-establishing of the sterile conditions. Further, it is no longer necessary to have available counter-guides of various dimensions but it is sufficient to have a single first profile outline, with an obvious saving in terms of production and storage.

Further, with a single and compact system, constituted by the connection cross-member and the actuating device, it is possible to adjust both the height of the conveyor belt and the first profile (i.e. the counter-guide).

As the control of the adjustment comes from outside (non-sterile area), the drawbacks of contamination and resetting are substantially reduced.

The invention claimed is:

1. A capping plant for capping containers made of thermoplastic material, comprising:
a capping unit of a rotating carousel type comprising a plurality of capping stations for applying concave closures to the containers and first guide means arranged so as to contact a part of a tubular body of said containers which part is exposed towards an outside of the rotating carousel of the capping unit;
a star-wheel located downstream of the capping unit for receiving the capped containers to which the concave closures have been applied;
an outfeed conveyor located downstream of the star-wheel;
characterised in that the capping plant comprises:
a connection cross-member between said first guide means and the outfeed conveyor, said outfeed conveyor being integrally constrained to a first portion of the connection cross-member and said first guide means being integrally constrained to a second portion of the connection cross-member;
an actuating device configured to adjust the height of said connection cross-member with respect to a rest plane of the capping unit.

2. The capping plant according to claim 1, wherein said first guide means comprise a first profile having a substantially arched extension that is coaxial to and external of a circular path defined by the containers during rotation of the rotating carousel of the capping unit.

3. The capping plant according to claim 2, wherein the first profile is made of a flexible material.

4. The capping plant according to claim 3, wherein the first profile is made of plastic material.

5. The capping plant according to claim 1, further comprising second guide means arranged so as to contact a part of the tubular body of said containers which part is facing towards an inside of the rotating carousel of the capping unit.

6. The capping plant according to claim 5, wherein said second guide means are slidably mounted on a third portion of the connection cross-member.

7. The capping plant according to claim 5, wherein said second guide means comprise a second profile having a substantially arched extension that is coaxial to and internal of a circular path defined by the containers during rotation of the rotating carousel of the capping unit, said second profile having a plurality of compartments for receiving the part of the tubular body of the containers facing towards an inside of the rotating carousel of the capping unit.

8. The capping plant according to claim 7, wherein said compartments have an adjustable size.

9. The capping plant according to claim 1, wherein said actuating device is driven manually or by means of a motorised control.

10. The capping plant according to claim 9, further comprising a box-like body defining a contamination-controlled environment isolated from an external environment, the capping unit, the star-wheel, the outfeed conveyor, the connection cross-member and the actuating device being located in said contamination-controlled environment, said actuating device being configured to receive commands from the external environment.

11. A method for capping and conveying containers made of thermoplastic material, comprising the steps of:
  applying to each container a concave closure in a capping unit of the rotating carousel type;
  during the rotation of the rotating carousel of the capping unit, guiding the containers to define a circular path via first guide means arranged so as to contact a part of a tubular body of the containers which part is exposed towards the outside of the rotating carousel of the capping unit;
  transferring the capped containers from the capping unit to a star-wheel in which the containers are supported by a neck thereof,
characterised by:
  transferring the containers from the star-wheel to an outfeed conveyor integrally constrained to said first guide means via a connection cross-member;
  adjusting the height of the connection cross-member in a case of a format change with respect to a rest plane of the capping unit.

12. The method according to claim 11, wherein when defining the circular path said containers are also guided by second guide means arranged so as to contact a part of the tubular body of the containers facing towards the inside of the rotating carousel of the capping unit.

13. The method according to claim 12, wherein said second guide means are slidably mounted on the connection cross-member.

14. The method according to claim 11, wherein said adjustment of the height takes place manually or by means of a motorised control.

* * * * *